United States Patent
Wu (10) Patent No.: US 9,772,500 B2
(45) Date of Patent: Sep. 26, 2017

(54) DOUBLE-LAYERED LIQUID CRYSTAL LENS AND 3D DISPLAY APPARATUS

(71) Applicant: BOE TECHNOLOGY GROUP CO., LTD., Beijing (CN)

(72) Inventor: Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 282 days.

(21) Appl. No.: 14/346,847

(22) PCT Filed: Nov. 21, 2013

(86) PCT No.: PCT/CN2013/087586
§ 371 (c)(1),
(2) Date: Mar. 24, 2014

(87) PCT Pub. No.: WO2014/198104
PCT Pub. Date: Dec. 18, 2014

(65) Prior Publication Data
US 2015/0185488 A1 Jul. 2, 2015

(30) Foreign Application Priority Data
Jun. 9, 2013 (CN) .......................... 2013 1 0231674

(51) Int. Cl.
*G02F 1/1335* (2006.01)
*G02B 27/22* (2006.01)
(Continued)

(52) U.S. Cl.
CPC ..... *G02B 27/2214* (2013.01); *G02F 1/13306* (2013.01); *G02F 1/13439* (2013.01);
(Continued)

(58) Field of Classification Search
CPC .......... G02F 1/13306; G02F 1/134309; G02F 1/13439; G02F 1/29; G02F 1/13471;
(Continued)

(56) References Cited

U.S. PATENT DOCUMENTS

2003/0210377 A1* 11/2003 Blum .................. G02B 27/017
351/159.4
2007/0008617 A1* 1/2007 Shestak .............. G02B 27/2214
359/455

(Continued)

FOREIGN PATENT DOCUMENTS

CN 101285938 A 10/2008
CN 102736353 A 10/2012
(Continued)

OTHER PUBLICATIONS

International Search Report mailed Mar. 20, 2014; PCT/CN2013/087586.

(Continued)

*Primary Examiner* — Hoan C Nguyen
(74) *Attorney, Agent, or Firm* — Ladas & Parry LLP (57) ABSTRACT

A double-layered liquid crystal lens in which two liquid crystal layers are disposed, and a 3D display apparatus. In a 3D display mode, under control of an electric field, liquid crystal molecules of a first liquid crystal layer are deflected to form a plurality of first lenticular lens structures. In case of switching from the 3D display mode into a 2D display mode, under the control of an electric field, liquid crystal molecules in a second liquid crystal layer are deflected to form a plurality of second lenticular lens structures; the second lenticular lens structures are mirror symmetric to the corresponding first lenticular lens structures, so as to compensate a phase delay of a light modulated by the first lenticular lens structures, such that the light passes through (Continued)

the double-layered liquid crystal lens without deflection, and thus a normal 2D display state is realized.

14 Claims, 6 Drawing Sheets

(51) Int. Cl.
    *G02F 1/29*     (2006.01)
    *G02F 1/1347*     (2006.01)
    *G02F 1/133*     (2006.01)
    *G02F 1/1343*     (2006.01)
    *H04N 13/02*     (2006.01)

(52) U.S. Cl.
    CPC .... *G02F 1/13471* (2013.01); *G02F 1/134309* (2013.01); *G02F 1/29* (2013.01); *G02F 2001/294* (2013.01); *H04N 13/0228* (2013.01)

(58) Field of Classification Search
    CPC ............. G02F 1/1347; G02F 2001/294; G02B 27/2214; H04N 13/0454
    USPC .......................................................... 349/95
    See application file for complete search history.

(56) References Cited

U.S. PATENT DOCUMENTS

| | | | |
|---|---|---|---|
| 2008/0252720 A1 | 10/2008 | Kim et al. | |
| 2008/0316380 A1* | 12/2008 | Ijzerman | G02B 27/2214 349/15 |
| 2010/0085860 A1* | 4/2010 | Katayama | G11B 7/1369 369/112.16 |
| 2012/0092586 A1* | 4/2012 | He | G02B 27/2214 349/61 |
| 2013/0314626 A1* | 11/2013 | Misaki | G06F 3/044 349/12 |
| 2014/0028933 A1* | 1/2014 | Chen | G02B 27/26 349/15 |

FOREIGN PATENT DOCUMENTS

| | | |
|---|---|---|
| CN | 103309096 A | 9/2013 |
| CN | 203299500 U | 11/2013 |
| KR | 1020080102755 A | 11/2008 |

OTHER PUBLICATIONS

First Chinese Office Action Appln. No. 201310231674.8; Dated Mar. 11, 2015.

International Preliminary Report on Patentability Appln. No. PCT/CN2013/087586; Dated Dec. 15, 2015.

Qunhua Wang, "3D Display Technology and Devices", Science Press, Apr. 2011, pp. 127-129.

Second Chinese Office Action Appln. No. 201310231674.8; Dated Oct. 8, 2015.

* cited by examiner

DOUBLE-LAYERED LIQUID CRYSTAL LENS AND 3D DISPLAY APPARATUS

TECHNICAL FIELD

Embodiments of the present invention relate to a double-layered liquid crystal lens and a three-dimension (3D) display apparatus.

BACKGROUND

In everyday life, people observe external stereoscopic scenes with two eyes. Three dimension (3D) display technology makes people obtain a sense of three-dimensional space based on the principle of binocular stereo vision. The principle mainly lies in that: the left and right eyes of a viewer receive different images, respectively, and then the left and right eye images can be analyzed and merged in the brain of the viewer so that the viewer can generate the three-dimensional sense.

At present, the 3D display technologies are mainly divided into two types: a naked-eye type and a glass type. As for the naked-eye type, with special arrangement on a display panel, 3D video images that are subjected to encoding treatment are individually transmitted into left and right eyes of a person, so that the user can obtain the three-dimensional sense by naked eyes without wearing any stereo glass.

Currently, a naked-eye 3D display apparatus is realized by placing a mask such as a grating barrier, a liquid crystal lens, or the like in front of a display panel; view fields are presented in front of the display panel with the grating barrier or the liquid crystal lens, so that the light emitted from different sub-pixel units of the display panel is incident into different view fields, and the two eyes of the viewer observe in the different view fields to obtain a three-dimensional sense. The principle of a liquid crystal lens is that: due to the fact that liquid crystal molecules have a birefringence property and the alignment direction thereof is changed as the electric field applied thereon varies, light can be focused or diffused, and thus an effective optical zoom is obtained within a small space.

Figure 1A:
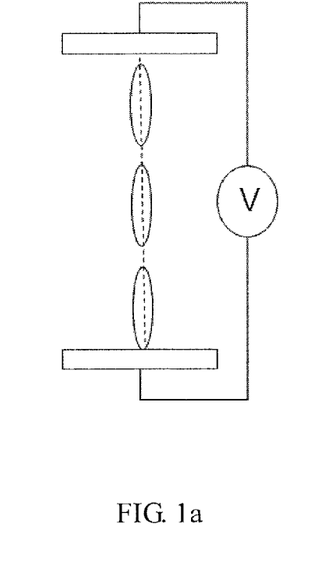
FIG. 1a is a schematic view of the orientation of positive liquid crystal molecules in an electric field.

Generally, positive liquid crystal molecules are employed in a liquid crystal lens. In case of switching from a 2D display mode into a 3D display mode, as illustrated in FIG. 1a, under the effect of an electric field, a long axis of a liquid crystal molecule is aligned along the direction of the electric field lines. Basing on this property, positive liquid crystal molecules can be driven by different electric fields to form a lens with a gradient reflectivity, i.e., a lenticular lens structure, which can be used to realize a naked-eye 3D display. In case of switching from the 3D display mode to the 2D display mode, the electric field applied on the liquid crystal molecules is typically removed to relax the liquid crystal molecules back to the initial state due to their own elasticity. Due to the capacitance between the liquid crystal molecules and the restriction on the rotational viscosity of the liquid crystal molecules, a response time of the relaxing process become too long, typically more than 1 second. The overly slow response significantly influences the display effect and the sensory experience during switching from the 3D display mode into the 2D display mode, and also is not helpful to realize the naked-eye 3D display in full resolution.

SUMMARY

Embodiments of the present invention provide a double-layered liquid crystal lens and a 3D display apparatus, which can solve the problem of low response speed during switching from a 3D display mode into a 2D display mode in an existing liquid crystal lens.

An embodiment of the present invention provides a double-layered liquid crystal lens comprising: a first substrate, a second substrate opposite to the first substrate, a third substrate interposed between the first substrate and the second substrate, a first liquid crystal layer interposed between the first substrate and the third substrate, and a second liquid crystal layer interposed between the second substrate and the third substrate.

A first transparent electrode is disposed on a side of the first substrate facing the first liquid crystal layer, a second transparent electrode is disposed on a side of the third substrate facing the first liquid crystal layer; in the 3D display mode, a voltage is applied across the first and second transparent electrodes to generate an electric field, so that liquid crystal molecules in the first liquid crystal layer are deflected by the electric field to form a plurality of first lenticular lens structures.

A third transparent electrode is disposed on a side of the second substrate facing the second liquid crystal layer, and a fourth transparent electrode is disposed on a side of the third substrate facing the second liquid crystal layer; in case of switching from the 3D display mode into the 2D display mode, a voltage is applied across the third and fourth transparent electrodes to generate an electric field, so that liquid crystal molecules in the second liquid crystal layer are deflected by the electric field to form a plurality of second lenticular lens structures in one-to-one correspondence to the first lenticular lens structures, and the second lenticular lens structures and the corresponding first lenticular lens structures are mirror symmetric with respect to the third substrate.

An embodiment of the present invention further provides a 3D display apparatus, comprising: a display panel, and a double-layered liquid crystal lens disposed on a light-emitting side of the display panel, the double-layered liquid crystal lens is the above described double-layered liquid crystal lenses provided in the above embodiment of the present invention.

DETAILED DESCRIPTION

The double-layered liquid crystal lens and the 3D display apparatus provided in the embodiments of the present invention are described as follow in connection with the accompanying drawings.

The thickness and size of respective layers illustrated in the drawings do not reflect the real scale of the liquid crystal lens, but are intended to illustrate the disclosure of the present invention.

Figure 2A:
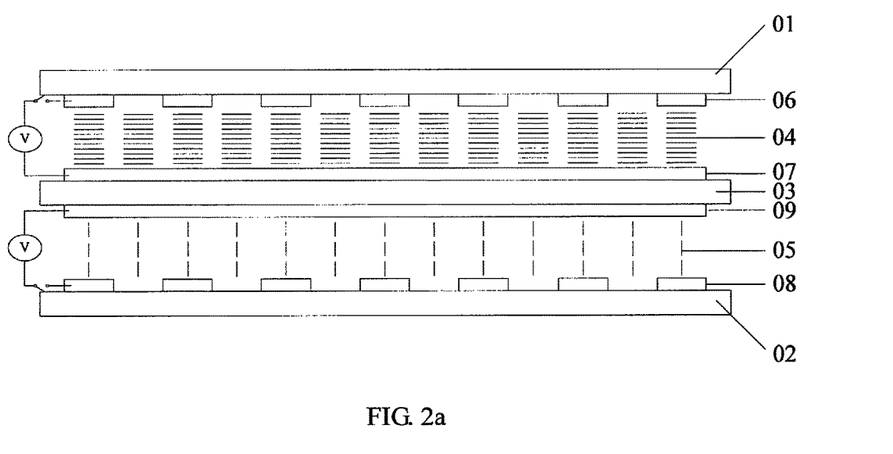
FIG. 2a is a schematic structure view of a double-layered liquid crystal lens provided in an embodiment of the present invention in an initial state.
Figure 2B:
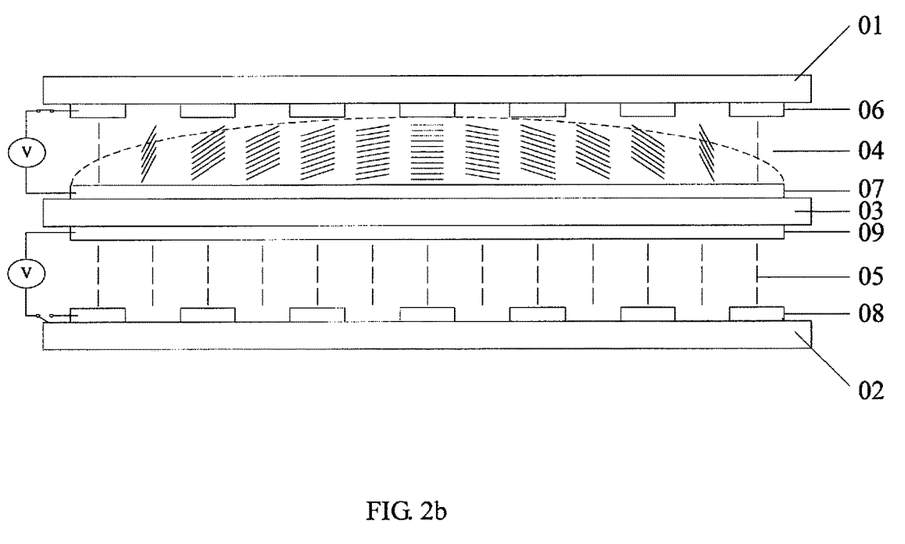
FIG. 2b is a schematic structure view of the double-layered liquid crystal lens provided in an embodiment of the present invention in a 3D display mode.
Figure 2C:
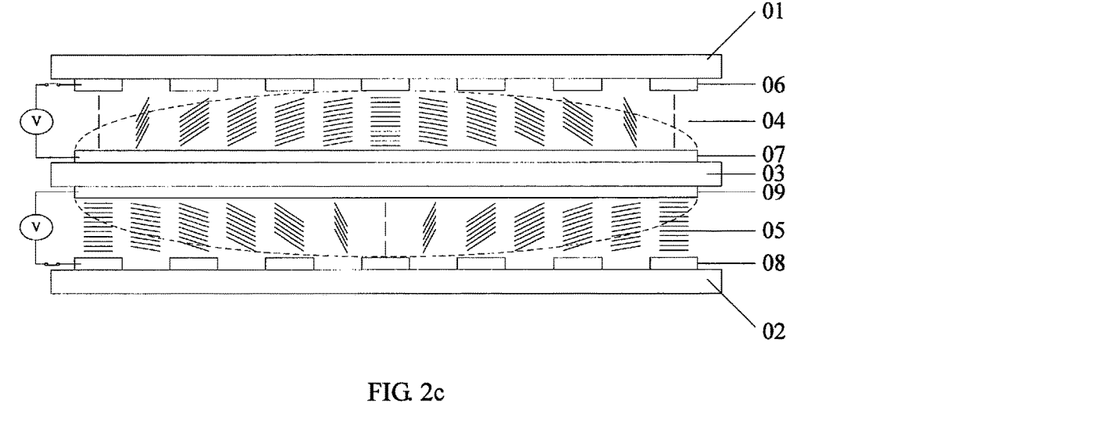
FIG. 2c is a schematic structure view of the double-layered liquid crystal lens provided in an embodiment of the present invention in case of switching from a 3D display mode into a 2D display mode.

An embodiment of the present invention provides a double-layered liquid crystal lens as illustrated in FIGS. 2a and 2c, which comprises: a first substrate 01, a second substrate 02 opposite to the first substrate 01, a third substrate 03 interposed between the first substrate 01 and the second substrate 02, a first liquid crystal layer 04 interposed between the first substrate 01 and the third substrate 03, and a second liquid crystal layer 05 interposed between the second substrate 02 and the third substrate 03.

A first transparent electrode 06 is formed on a side of the first substrate 01 facing the first liquid crystal layer 04, and a second transparent electrode 07 is formed on a side of the third substrate 03 facing the first liquid crystal layer 04. As illustrated in FIG. 2b, in a 3D display mode, a voltage is applied across the first transparent electrode 06 and the second transparent electrode 07 to generate an electric field, so that liquid crystal molecules in the first liquid crystal layer 04 are deflected by the electric field to form a plurality of first lenticular lens structures (FIG. 2b shows one of the first lenticular lens structures).

A third transparent electrode 08 is formed on a side of the second substrate 02 facing the second liquid crystal layer 05, and a fourth transparent electrode 09 is formed on a side of the third substrate 03 facing the second liquid crystal layer 05. As illustrated in FIG. 2c, in case of switching from a 3D display mode into a 2D display mode, a voltage is applied across the third transparent electrode 08 and the fourth transparent electrode 09 to generate an electric field, so that the liquid crystal molecules in the second liquid crystal layer 05 are deflected by the electric field to form a plurality of second lenticular lens structures in one-to-one correspondence to the first lenticular lens structures (FIG. 2c shows one of the second lenticular lens structures). The second lenticular lens structures and the corresponding first lenticular lens structures are mirror symmetric with respect to the third substrate 03.

For example, the third substrate of the liquid crystal lens provided in the embodiment of the present invention may refer to the combination of two or more attached substrates or may refer to one substrate, which is not of limit.

The above liquid crystal lens provided in the embodiment of the present invention is configured to add one liquid crystal layer in the current liquid crystal lens, and an operating principle thereof is described as follow.

In an initial state, i.e., in the 2D display mode, as illustrated in FIG. 2a, the liquid crystal molecules in both the liquid crystal layers are not deflected, and thus there is no impact on the polarized light which is passing therethrough.

In case of switching from the initial state into the 3D display mode, as illustrated in FIG. 2b, under the control of the electric field generated between the first transparent electrode 06 and the second transparent electrode 07, the liquid crystal molecules in the first liquid crystal layer 04 are deflected to form the plurality of first lenticular lens structures, which may be lenticular convex lens and modulate the polarized light that is passing therethrough so as to function as a liquid crystal lens; there is no voltage applied between the third transparent electrode 08 and the fourth transparent electrode 09, so the liquid crystal molecules of the second liquid crystal layer 05 are not deflected, the polarized light is not changed after it passes through the second liquid crystal layer 05, and therefore the modulation of the light by the first liquid crystal layer 04 is not affected.

In case of switching from the 3D display mode into the 2D display mode, as illustrated in FIG. 2c, the electric field generated between the first transparent electrode 06 and the second transparent electrode 07 is not changed, and under the control of the electric field generated between the third transparent electrode 08 and the fourth transparent electrode 09, the liquid crystal molecules in the second liquid crystal layer 05 are deflected to form a plurality of second lenticular lens structures in one-to-one correspondence to the first lenticular lens structures; the second lenticular lens structures are mirror symmetric to the corresponding first lenticular lens structures. In particular, if the first lenticular lens structures are lenticular convex lens, then the second lenticular lens are lenticular concave lens. As illustrated in FIG. 2c, the phase delay curve of the second lenticular lens structure (shown as a dashed line in the second liquid crystal layer 05 in the drawing) is symmetric to the phase delay curve of the first lenticular lens structure (shown as a dashed line in the first liquid crystal layer 04 in the drawing), and the second lenticular lens structure compensates the phase delay of the light modulated by the first lenticular lens structure, so that the light passes through the double-layered liquid crystal lens without any phase modulation and deflection, and thus the normal 2D display state can be realized.

Due to the capacitance between the liquid crystal molecules and the restriction upon the rotational viscosity of the liquid crystal molecules, the response time for returning the liquid crystal molecules back to the initial state after the electric field is removed is much longer than that under the control of the electric field. Accordingly, in case of switching from the 3D display mode into the 2D display mode, the embodiment of the present invention utilize the electric field to control the deflection of the liquid crystal molecules in the second liquid crystal layer and form the second lenticular lens structure for counteracting the phase delay produced by the first lenticular lens structure. Compared with the related art in which the electric field applied to the liquid crystal molecules is removed and then the liquid crystal molecules slowly relax back to the initial state with their own elasticity, the embodiment of the present invention can increase the response speed of the liquid crystal lens in case of switching from the 3D display mode into the 2D display mode, thereby improve display quality.

For example, the liquid crystal molecules in the first liquid crystal layer 04 may have a polarity opposite to that in the second liquid crystal layer 05. For example, in FIGS. 2a to 2c, the first liquid crystal layer 04 comprising positive liquid crystal molecules and the second liquid crystal layer 05 comprising negative liquid crystal molecules are described as an example, while the first liquid crystal layer comprising the negative liquid crystal molecules and the liquid crystal layer comprising the positive liquid crystal molecules are also can be used, which is not of limit.

Figure 1B:
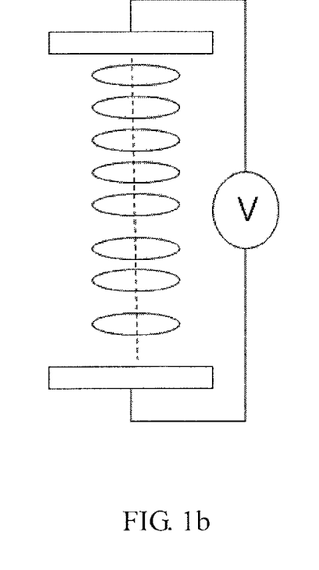
FIG. 1b is a schematic view of the orientation of negative liquid crystal molecules in an electric field.

A long axis of a positive liquid crystal molecule is aligned along the electric field line as illustrated in FIG. 1a and a short axis of a negative liquid crystal molecule is aligned along the electric field line as illustrated in FIG. 1b. Therefore, in case of switching from the 3D display mode into the 2D display mode, the electric field generated between the third transparent electrode 08 and the fourth transparent electrode 09 can be configured to be symmetric to the electric field generated between the first transparent electrode 06 and the second transparent electrode 07, thereby the phase delays of the polarized light, which are caused by the liquid crystal molecules having the opposite polarities in the symmetric electric fields, can complement each other. As a result of the modulation on the polarized light by the double-layered liquid crystal lens, the polarized light is not deflected, and the normal 2D display can be realized.

In the initial state, the long axes of the liquid crystal molecules having the opposite polarities are set to be perpendicular to each other, that is, the long axis of the liquid crystal molecule in the first liquid crystal layer 04 is perpendicular to the long axis of the liquid crystal molecule in the second liquid crystal layer 05, as illustrated in FIG. 2a, to prevent the polarized light from being modulated by the liquid crystal molecules in the first and second liquid crystal layers 04 and 05 in the initial state.

For example, the first transparent electrode 06 disposed on the first substrate 01 may be of strip electrodes, and the second transparent electrode 07 disposed on the third substrate 03 may be of a plate electrode, as illustrated in FIGS. 2a to 2c; or, the first transparent electrode 06 disposed on the first substrate 01 may be of a plate electrode, and the second transparent electrode 07 disposed on the third substrate 03 may be of strip electrodes, which may not be limit.

Similarly, for example, the third transparent electrode 08 disposed on the second substrate 01 may be of strip electrodes, and the fourth transparent electrode 09 disposed on the third substrate 03 may be of a plate electrode, as illustrated in FIGS. 2a to 2c; or the third transparent electrode 08 disposed on the second substrate 02 may be of a plate electrode, and the fourth transparent electrode 09 disposed on the third substrate 03 may be of strip electrodes, which may not be limited thereto.

Figure 3A:
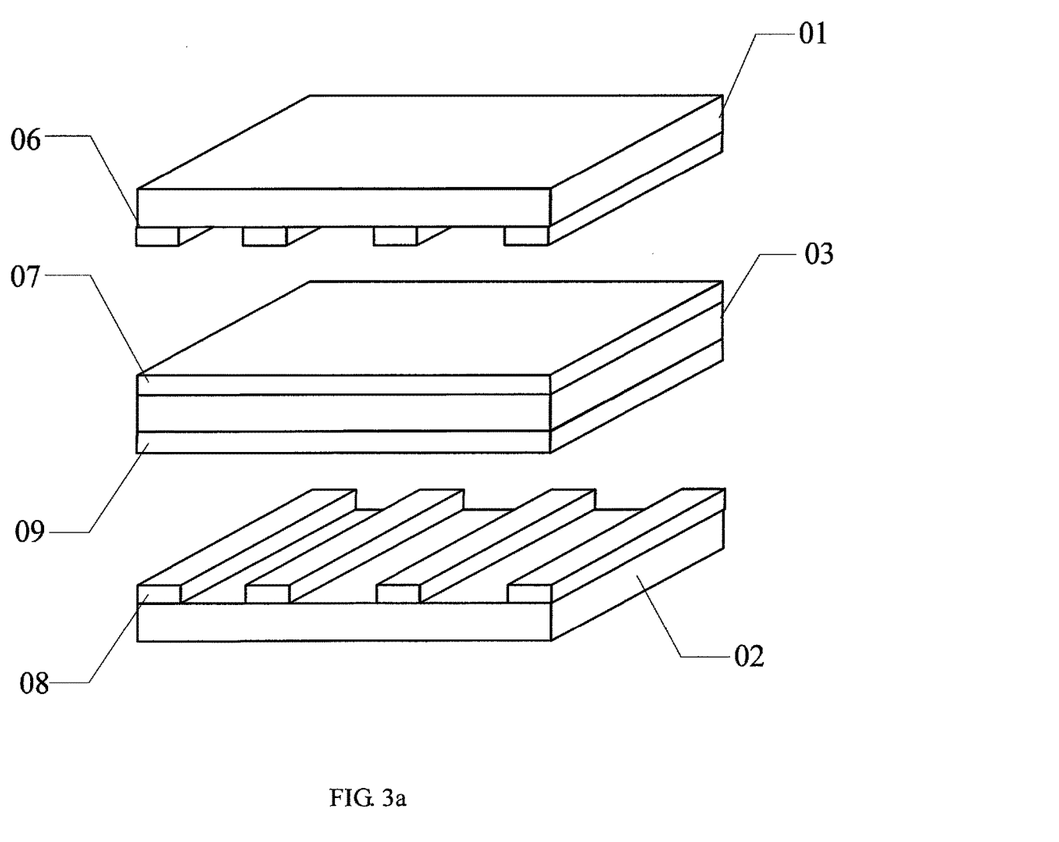
FIGS. 3a-3d are schematic structure views of transparent electrodes in the double-layered liquid crystal lens provided in an embodiment of the present invention.

In particular, FIGS. 3a to 3d illustrate four examples of the embodiment of the present invention. The first example as illustrated in FIG. 3a is that: both the first transparent electrode 06 disposed on the first substrate 01 and the third transparent electrode 08 disposed on the second substrate 02 are of strip electrodes, and the second and fourth transparent electrode 07 and 09 disposed on the opposite sides of the third substrate 03 are of a plate electrode. The strip electrodes of the first and third transparent electrodes 06 and 08 are extended in a same direction.

Figure 3B:
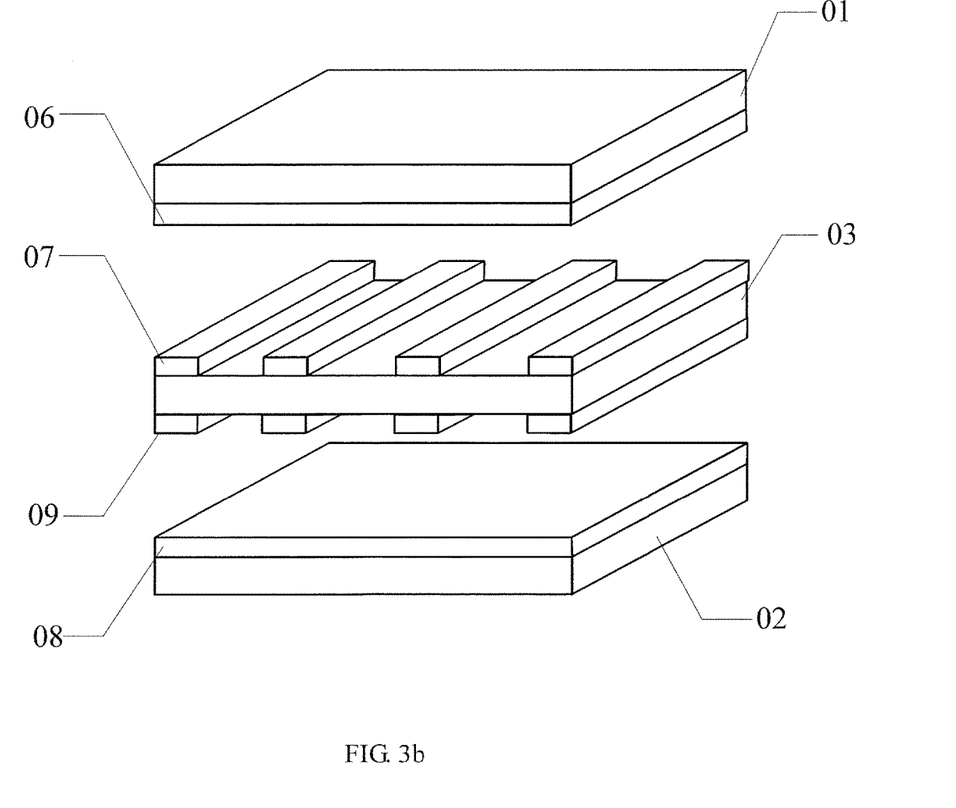

The second example as illustrated in FIG. 3b is that: both the first transparent electrode 06 disposed on the first substrate 01 and the third transparent electrode 08 disposed on the second substrate 02 are of a plate electrode, and the second and fourth transparent electrodes 07 and 09 disposed on opposite sides of the third substrate 03 are of strip electrodes. The strip electrodes of the second and fourth transparent electrodes 07 and 09 are extended in a same direction.

Figure 3C:
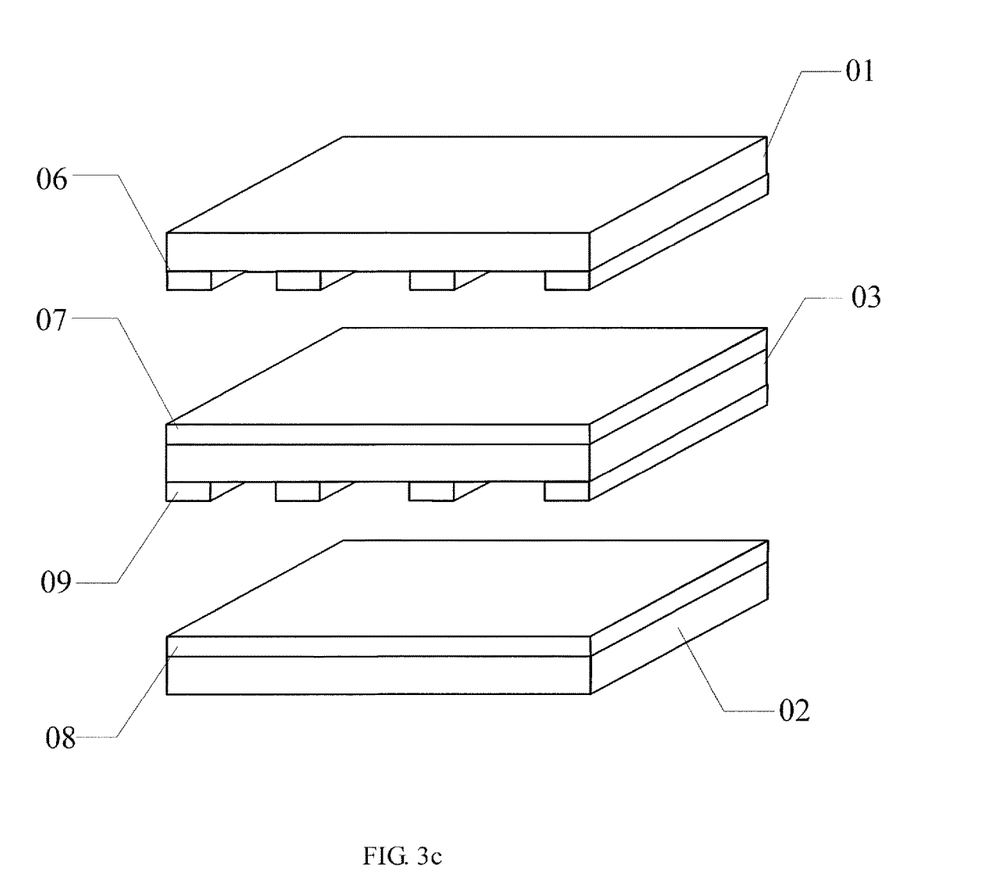

The third example as illustrated in FIG. 3c is that: both the first transparent electrode 06 disposed on the first substrate 01 and the fourth transparent electrode 09 disposed on the third substrate 03 are of strip electrodes, and both the second transparent electrode 07 disposed on the third substrate 03 and the third transparent electrode 08 disposed on the second substrate 02 are of a plate electrode. The strip electrodes of the first and fourth transparent electrodes 06 and 09 are extended in a same direction.

Figure 3D:
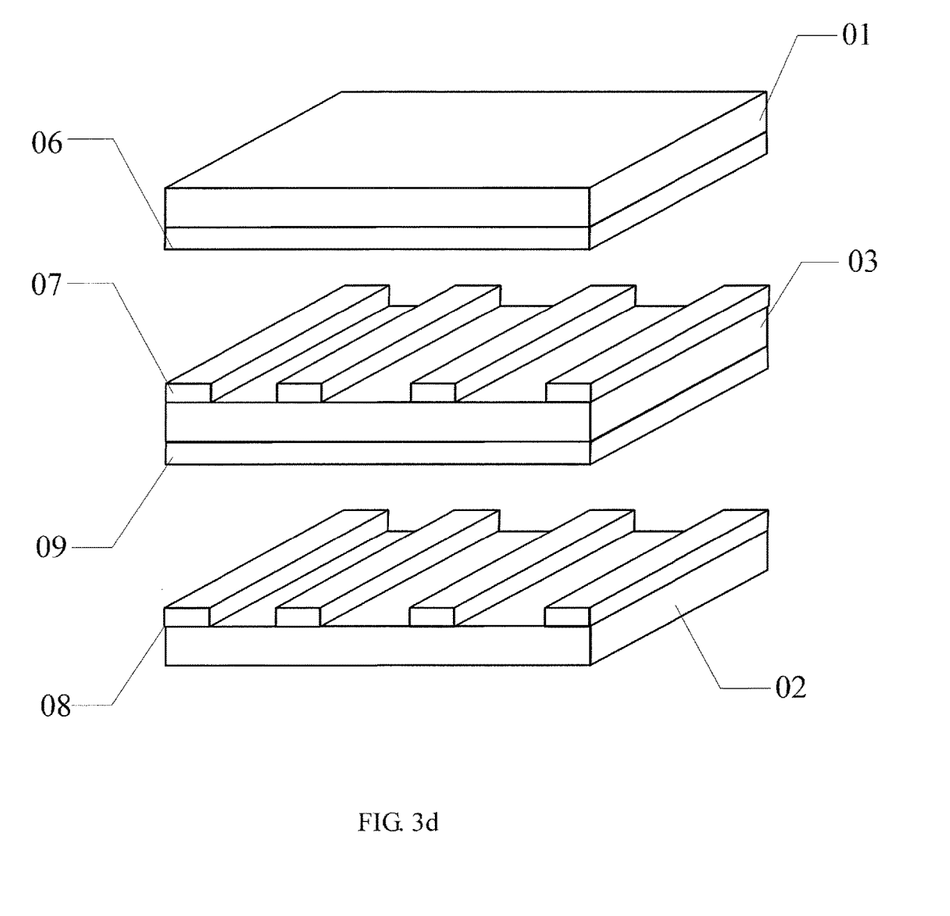

The fourth example as illustrated in FIG. 3d is that: both the first transparent electrode 06 disposed on the first substrate 01 and the fourth transparent electrode 09 disposed on the third substrate 03 are of a plate electrode, and both the second transparent electrode 07 disposed on the third substrate 03 and the third transparent electrode 08 disposed on the second substrate 02 are of strip electrodes. The strip electrodes of the second and third transparent electrodes 07 and 08 are extended in a same direction.

For example, the first, second, third, and fourth transparent electrodes may be made of ITO or IZO, which is not of limit.

An embodiment of the present invention also provide a 3D display apparatus comprising a display panel and a double-layered liquid crystal lens disposed on a light-emitting side of the display panel, which is any of the above described double-layered liquid crystal lenses provided in the embodiments of the present invention. The display apparatus may be any product or device having a display function, such as, cellphone, tablet PC, TV set, monitor, notebook computer, digital photo frame, navigator, or the like. The implementation of the 3D display apparatus can reference to the above embodiments of the double-layered liquid crystal lens, so the repeated detailed description is omitted.

Generally, one pixel unit in the display panel is composed of three sub-pixel units, for example, red, green, and blue sub-pixel units. In the 3D display mode, odd number columns of the sub-pixel units are made to display a left eye image and even number columns of the sub-pixel units are made to display a right eye image. Also, n sub-pixel units may be grouped to one period, the left and right eye images are displayed alternatively in these periods, which is not of limit.

In this way, the respective first lenticular lens structure of the double-layered liquid crystal lens is disposed to correspond to at least two adjacent columns of the sub-pixel units in the display panel; similarly, the respective second lenticular lens structure of the double-layered liquid crystal lens is disposed to correspond to at least two adjacent columns of the sub-pixel units in the display panel. Thus, in the 3D display mode, the first lenticular lens structure may simultaneously correspond to the sub-pixel units for displaying the left and right eye images, the liquid crystal lens separates the left and right eye images from each other to realize 3D display.

For example, in the 3D display mode, the respective first lenticular lens structure generally corresponds to two adjacent columns of the sub-pixel units, the left eye image is displayed in the odd columns of the sub-pixel units, and the right eye image is displayed in the even columns of the sub-pixel units.

The embodiments of the present invention provide a double-layered liquid crystal lens, in which two liquid crystal layers are provided, and a 3D display apparatus. In the 3D display mode, under the control of the electric field, the liquid crystal molecules in the first liquid crystal layer are deflected to form the plurality of first lenticular lens structures. In case of switching from the 3D display mode into the 2D display mode, under the control of the electric field, the liquid crystal molecules in the second liquid crystal layer are deflected to form the plurality of second lenticular lens structures in one-to-one correspondence to the first lenticular lens structures; the second lenticular lens structures are mirror symmetric to the corresponding first lenticular lens structures so as to compensate the phase delay of the light modulated by the first lenticular lens structures, such that the light passes through the double-layered liquid crystal lens without any phase modulation and deflection, and thus the normal 2D display state is realized. Since the response time for the liquid crystal molecules returning back to the initial state under the control of the electric field is much shorter than that after the electric field is removed, in case of switching from the 3D display mode into the 2D display mode, the electric field controls the liquid crystal molecules in the second liquid crystal layer to be deflected, and the second lenticular lens structure for counteracting the phase delay provided by the first lenticular lens structure is formed. Compared with the related art in which the electric field applied on the liquid crystal molecules is removed and then the liquid crystal molecules slowly relax back to the initial state with their own elasticity, the embodiments of the present invention can increase the response speed of the liquid crystal lens in case of switching from the 3D display mode into the 2D display mode, thereby improve display quality.

Obviously, those skilled in the art can make various modification and changes upon the present invention without departure from the spirit and scope of the present invention. In this way, if these modification and changes of the present invention are within the claims of the present invention and the equivalents thereof, then the present invention comprises these modification and changes.

The invention claimed is:

1. A double-layered liquid crystal lens, comprising: a first substrate, a second substrate opposite to the first substrate, a third substrate interposed between the first substrate and the second substrate, a first liquid crystal layer interposed between the first substrate and the third substrate, and a second liquid crystal layer interposed between the second substrate and the third substrate;

wherein a first transparent electrode is disposed on a side of the first substrate facing the first liquid crystal layer, a second transparent electrode is disposed on a side of the third substrate facing the first liquid crystal layer; in a 3D display mode, a voltage across the first and second transparent electrodes is applied to generate an electric field and no voltage across the third and fourth transparent electrodes is applied, so that liquid crystal molecules in the first liquid crystal layer are deflected by the electric field to form a plurality of first lenticular lens structures;

wherein a third transparent electrode is disposed on a side of the second substrate facing the second liquid crystal layer, and a fourth transparent electrode is disposed on a side of the third substrate facing the second liquid crystal layer; in a 2D display mode, a voltage across the third and fourth transparent electrodes is applied to generate an electric field and the voltage across the first and second transparent electrodes is still applied, so that liquid crystal molecules in the second liquid crystal layer are deflected by the electric field to form a plurality of second lenticular lens structures in one-to-one correspondence to the first lenticular lens structures, and the second lenticular lens structures and the corresponding first lenticular lens structures are mirror symmetric with respect to the third substrate;

wherein in the 2D display mode, each second lenticular lens structure has a phase delay curve symmetric to that of a corresponding first lenticular lens structure with respect to the third substrate; and wherein the liquid crystal molecules in the first liquid crystal layer have a polarity opposite to that of the liquid crystal molecules in the second liquid crystal layer.

2. The double-layered liquid crystal lens according to claim 1, wherein the liquid crystal molecules in the first liquid crystal layer are positive liquid crystal molecules, and the liquid crystal molecules of the second liquid crystal layer are negative liquid crystal molecules.

3. The double-layered liquid crystal lens according to claim 2, wherein in an initial state, a long axis direction of the liquid crystal molecules in the first liquid crystal layer is perpendicular to a long axis direction of the liquid crystal molecules in the second liquid crystal layer.

4. The double-layered liquid crystal lens according to claim 1, wherein the first transparent electrode are of strip electrodes, and the second transparent electrode is of a plate electrode; or, the second transparent electrode is of strip electrodes, and the first transparent electrode is of a plate electrode.

5. The double-layered liquid crystal lens according to claim 1, wherein the third transparent electrode is of strip electrodes, and the fourth transparent electrode is of a plate electrode; or
the third transparent electrode is of strip electrodes, and the fourth transparent electrode is of a plate electrode.

6. A three-dimension display apparatus comprising: a display panel, and a double-layered liquid crystal lens disposed on a light-emitting side of the display panel, the double-layered liquid crystal lens being any one of the double-layered liquid crystal lenses according to claim 1.

7. The three-dimension display apparatus according to claim 6, wherein the respective first lenticular lens structure formed in the double-layered liquid crystal lens corresponds to at least two adjacent columns of sub-pixel units in the display panel.

8. The double-layered liquid crystal lens according to claim 1, wherein the first transparent electrode are of strip electrodes, and the second transparent electrode is of a plate electrode; or, the second transparent electrode is of strip electrodes, and the first transparent electrode is of a plate electrode.

9. The double-layered liquid crystal lens according to claim 1, wherein the third transparent electrode is of strip electrodes, and the fourth transparent electrode is of a plate electrode; or
the third transparent electrode is of strip electrodes, and the fourth transparent electrode is of a plate electrode.

10. The double-layered liquid crystal lens according to claim 2, wherein the first transparent electrode are of strip electrodes, and the second transparent electrode is of a plate electrode; or, the second transparent electrode is of strip electrodes, and the first transparent electrode is of a plate electrode.

11. The double-layered liquid crystal lens according to claim 2, wherein the third transparent electrode is of strip electrodes, and the fourth transparent electrode is of a plate electrode; or
the third transparent electrode is of strip electrodes, and the fourth transparent electrode is of a plate electrode.

12. The double-layered liquid crystal lens according to claim 3, wherein the first transparent electrode are of strip electrodes, and the second transparent electrode is of a plate electrode; or, the second transparent electrode is of strip electrodes, and the first transparent electrode is of a plate electrode.

13. The double-layered liquid crystal lens according to claim 3, wherein the third transparent electrode is of strip electrodes, and the fourth transparent electrode is of a plate electrode; or
the third transparent electrode is of strip electrodes, and the fourth transparent electrode is of a plate electrode.

14. The double-layered liquid crystal lens according to claim 1, wherein in the 2D display mode, the second lenticular lens structures are configured to compensate phase delays of lights modulated by the first lenticular lens structures, so that the lights pass through the double-layered liquid crystal lens without phase modulation and deflection.

\* \* \* \* \*